United States Patent [19]
Kameda et al.

[11] Patent Number: 5,511,448
[45] Date of Patent: Apr. 30, 1996

[54] POWER TRANSFER APPARATUS FOR FOUR-WHEEL DRIVE AUTOMOTIVE VEHICLE

[75] Inventors: Osamu Kameda; Masami Masuno; Yoshitaka Nomoto; Youichi Hiraoka, all of Hiroshima, Japan

[73] Assignee: Mazda Motor Corporation, Hiroshima, Japan

[21] Appl. No.: 329,100

[22] Filed: Oct. 25, 1994

[30] Foreign Application Priority Data

Oct. 26, 1993 [JP] Japan .................... 5-267316
Feb. 24, 1994 [JP] Japan .................... 6-026451

[51] Int. Cl.⁶ .................... B60K 17/35; F16H 57/02
[52] U.S. Cl. .................... 74/665 GE; 74/606 R; 180/247; 180/248; 184/11.2
[58] Field of Search .................... 74/606 R, 665 F, 74/665 G, 665 GE; 180/233, 247, 248; 184/6.12, 11.2

[56] References Cited

U.S. PATENT DOCUMENTS

| | | | |
|---|---|---|---|
| 4,103,753 | 8/1978 | Holdeman | 180/247 |
| 4,367,661 | 1/1983 | Moroto et al. | 74/606 R X |
| 4,601,359 | 7/1986 | Weismann | 180/248 X |
| 4,713,980 | 12/1987 | Ida et al. | 184/6.12 X |
| 4,781,266 | 11/1988 | Hotta et al. | 180/247 X |
| 4,854,413 | 8/1989 | Kameda et al. | 180/247 |
| 4,923,029 | 5/1990 | Lanzer | 180/248 |
| 5,363,722 | 11/1994 | Klotz | 74/606 R |

FOREIGN PATENT DOCUMENTS

| | | | |
|---|---|---|---|
| 4200998 | 7/1993 | Germany | 180/247 |
| 61-295133 | 12/1986 | Japan | 180/233 |
| 62-6835 | 1/1987 | Japan | 180/247 |
| 62-175221 | 7/1987 | Japan | 180/247 |
| 1-215627 | 8/1989 | Japan | 180/233 |
| 2-60837 | 3/1990 | Japan . | |
| 2-82628 | 6/1990 | Japan . | |
| 3-92661 | 4/1991 | Japan | 74/606 R |
| 6-117521 | 4/1994 | Japan | 74/606 R |

*Primary Examiner*—Charles A. Marmor
*Assistant Examiner*—Nathan O. Jensen
*Attorney, Agent, or Firm*—Fish & Richardson

[57] ABSTRACT

A driving power transfer apparatus for four-wheel drive automotive vehicles, has a primary output shaft for providing driving power for a rear propeller shaft and a secondary hollow output shaft for providing driving power for a front propeller shaft, and a drive power transfer, such as a fluid coupling, mounted on the secondary output shaft, for variably transmitting the driving power to the secondary output shaft from the primary output shaft. The secondary shaft is connected to a front propeller shaft via a splined sliding yoke.

17 Claims, 5 Drawing Sheets

POWER TRANSFER APPARATUS FOR FOUR-WHEEL DRIVE AUTOMOTIVE VEHICLE

BACKGROUND OF THE INVENTION

1. Field of the Invention

The resent invention relates to a power transfer apparatus for four-wheel drive automotive vehicles, and, more particularly, to a differential power transfer apparatus which has a primary shaft to which engine output is transmitted and a secondary shaft, operationally coupled to the primary shaft, which is coupled to a propeller shaft through a splined sliding yoke.

2. Description of Related Art

Typically, four-wheel drive automotive vehicles are provided with power transfer apparatuses having a primary shaft and a secondary shaft, which are arranged in parallel with each other, for providing driving force to both front and rear propeller shafts. In general, if such a transfer is installed on front-engine rear-drive (FR) vehicles, these primary and secondary shafts are respectively joined to the front and rear propeller shafts. In particular, through the front propeller shaft, the secondary shaft is linked with a front differential. In this instance, since the center axis of rotation of the secondary shaft is ordinarily offset both vertically and horizontally from the axis of the front differential, they are necessarily joined to the front propeller shaft by means of yokes. Further, since the front differential tosses responding to vertical motion of suspensions while the vehicle is running, there is always caused changes in distance between the transfer and the front differential. Various efforts have been made to cancel such a change in order to provide for an optimum arrangement of the drive line.

One such effort is described in Japanese Unexamined Utility Model Publication No. 2-82628. The approach used was to provide a damper mechanism in the drive line between the secondary shaft and the front differential. This damper mechanism includes a splined sliding yoke for providing a splined joint between the secondary shaft and the front propeller shaft so as to cancel changes in distance between the transfer and the front differential.

While the drive line in which the secondary shaft and the front propeller shaft are joined by means of a splined sliding yoke may have advantages over the prior art, nevertheless, various intricacy must be imposed upon the joint and other relating elements. For instance, since the secondary shaft and the front propeller shaft intersect at an angle, these shafts have a slight bend between them at the splined joint, causing swaying engagement between them. When a bend changes increasingly or decreasingly while these shafts rotate and slide relatively each other, vibrations and noise are generated which are always undesirable. In this instance, since many transfers have secondary shafts which are relatively light in weight and have natural frequencies as high as those responsive to normal rotational speeds of engines, vibration accompanying with slide displacement of the splined joint is amplified due to resonance through the secondary shaft, making noise and sound.

In addition, the power transfer apparatus includes a power transmission means having a drive sprocket fixedly mounted on the primary shaft, a driven sprocket mounted for rotation on the secondary shaft, and a drive chain engaging these sprockets so as to transmit driving power to a driving power transfer means, such as a fluid coupling, mounted on the secondary shaft. In order to allow smooth differential motion between the first and second shafts, it is necessary to lubricate the interface between the rotary member and the secondary shaft.

Lubrication of the interface between these rotary member and secondary shaft is typically made with oil in the transfer casing. However, because the drive chain scoops up the lubrication oil and splashes it, there is caused shortage of the lubrication oil in the transfer casing, leading to an insufficient lubrication of the interface.

SUMMARY OF THE INVENTION

It is an object of the present invention to provide a power transfer apparatus for four-wheel drive vehicles in which a secondary output shaft has a reduced natural frequency so as to eliminate resonance vibration of a splined joint between a sliding yoke and the secondary output shaft, and hence undesirable noise.

It is another object of the present invention to provide a power transfer apparatus for four-wheel drive vehicles in which a power transfer apparatus is well lubricated.

The above objects of the present invention are achieved by providing a driving power transfer apparatus for four-wheel drive automotive vehicles, which has a primary output shaft for providing driving power for a rear propeller shaft and a secondary hollow output shaft, arranged in parallel with the primary output shaft, for providing driving power for a front propeller shaft, and a drive power transfer means such as fluid couplings and electromagnetic couplings, mounted on the secondary output shaft, for variably transferring the driving power to the secondary output shaft from the primary output shaft. The driving power is transmitted by a power transmission means, such as including a drive sprocket fixedly mounted on the primary output shaft, a driven sprocket mounted for rotation on the secondary output shaft, and a drive chain operationally coupling the drive and driven sprockets. The driven sprocket is arranged adjacent to the power transfer means.

The power transfer apparatus has a lubrication means for the lubrication of the interface between the driven sprocket and the secondary output shaft, which comprises an oil guide groove formed integrally with a casing of the power transfer apparatus so as to collect lubrication oil scooped and splashed by the drive chain and introduce it inside the secondary hollow output shaft. While the secondary output shaft rotates, the lubrication oil inside the secondary output shaft is impelled to the interface through radial bores formed in the secondary output shaft.

According to the present invention, the power transfer apparatus variably transfers driving power, on one hand directly, to the rear propeller shaft and, on the other hand, to the front propeller shaft the power transfer means via the splined sliding yoke, canceling changes in distance between the transfer and the front differential and consequently, providing certain transference of driving power to the front propeller shaft in spite of up and down motion of the front suspensions. Furthermore, the power transfer means, mounted on the secondary hollow output shaft 3, functions as anti-vibration mass relative to the secondary output shaft, the secondary hollow output shaft 3 reduces a natural frequency and consequently, reduces its own resonance vibration and noise remarkably. In addition, because the hollow secondary output shaft has a greater area of heat radiating surface, it quickly radiates heat generated between the power transfer means and the secondary output shaft, preventing overheating of the power transfer means so as to assure reliable operation of the power transfer means.

Since the oil guide groove is simply formed integrally with the rear casing cover, it introduces lubrication oil in the transfer apparatus casing and is scooped up by the drive chain into the axial bore of the secondary output shaft, so that a sufficient amount of lubrication oil is introduced and directed to the interface between the driven sprocket and the secondary output shaft.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements throughout the drawings, and in which.

DETAILED DESCRIPTION OF THE PREFERRED EMBODIMENTS

Figure 1:
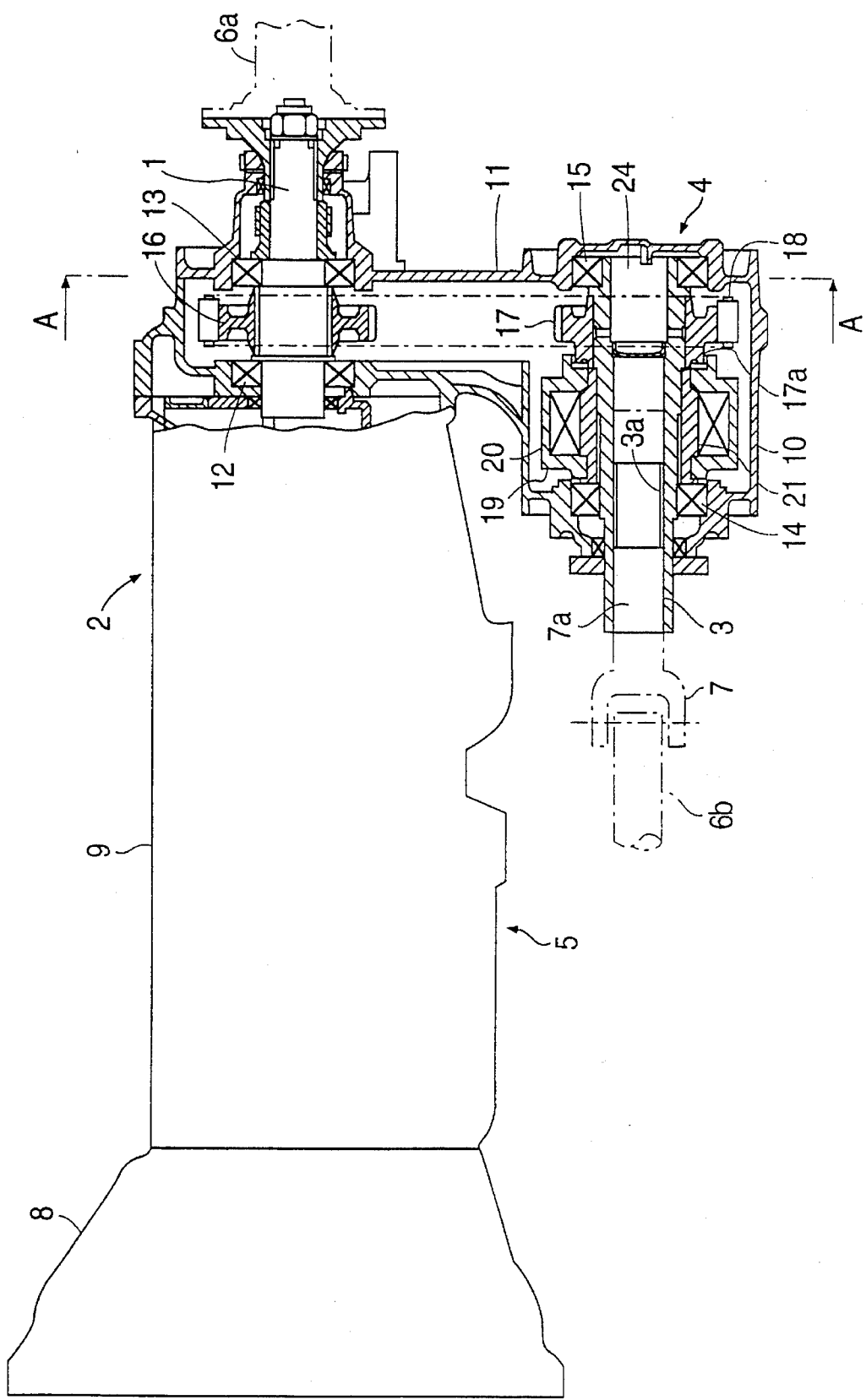
FIG. 1 is a cross-sectional view showing essential part of a power transfer apparatus for a four-wheel drive automotive vehicle in accordance with a preferred embodiment of the present invention.

Referring now to the drawings in detail, and in particular, to FIG. 1, a power transfer apparatus for use with four-wheel drive automotive vehicles in accordance with a preferred embodiment of the present invention is shown, which cooperates with a transmission 2, only schematically illustrated, and has a transfer mechanism 4 enclosed in a transfer apparatus casing 5. The transmission 2 has a transmission output shaft as a primary output shaft 1 directly coupled to a rear propeller shaft 6a so as to provide driving force to rear wheels (not shown). The transfer 4 has a transfer output shaft as a secondary output shaft 3 coupled to a front propeller shaft 6b via a splined sliding yoke 7 so as to provide driving force to front wheels (not shown). The transfer apparatus casing 5 is comprised of several elemental housings, such as a clutch housing 8 enclosing a clutch, a transmission housing 9 enclosing a transmission main shaft, a transmission counter shaft and transmission gears, a transfer housing 10 enclosing the transfer mechanism 4, and a rear casing cover 11. The primary output shaft 1 is supported for rotation by the transmission housing 8 and the rear casing cover 11 through thrust bearings 12 and 13. Similarly, the secondary output shaft 3 is supported for rotation by the transfer housing 10 through thrust bearings 14 and 15. The transfer mechanism 4 includes a power transmission means comprising a drive sprocket 16 spline-coupled to the primary output shaft 1, a driven sprocket 17 mounted for rotation on the secondary output shaft 3, a drive chain 18 engaged with both drive and driven sprockets 16 and 17, and a driving power transfer means 19 for variably transferring driving power from the driven sprocket 17 to the secondary output shaft 3.

The power transfer means 19, such as comprising a viscous coupling, is comprised of an outer cylindrical drum 20 having a U-shaped cross section and an inner cylindrical barrel 21 mounted on and spline-coupled to the secondary output shaft 3. The outer drum 20, which is provided with a stack of drive discs coaxially arranged with regular separations, is spline-coupled to a boss 17a of the driven sprocket 17. The inner barrel 21, which is provided with a stack of driven discs coaxially arranged with regular separations, is spline-coupled to the secondary output shaft 3. The outer cylindrical drum 20 is fitted for rotation onto the inner cylindrical barrel 21 to form a tightly closed space therebetween in which these stacks of discs are arranged in alternate fashion and a special viscous fluid, such as a silicon oil, is filled so as to provide a viscous coupling for variably transferring driving power from the driven sprocket 17 to the secondary output shaft 3. That is, the viscous coupling power transfer means 19 functions such that when the outer drum 20 is driven, a rotary motion of the viscous fluid is caused and drives the inner barrel 21. The transferred power increases as the difference in rotational speed between the driven sprocket 17 and the secondary output shaft 3 becomes larger.

Figure 2:
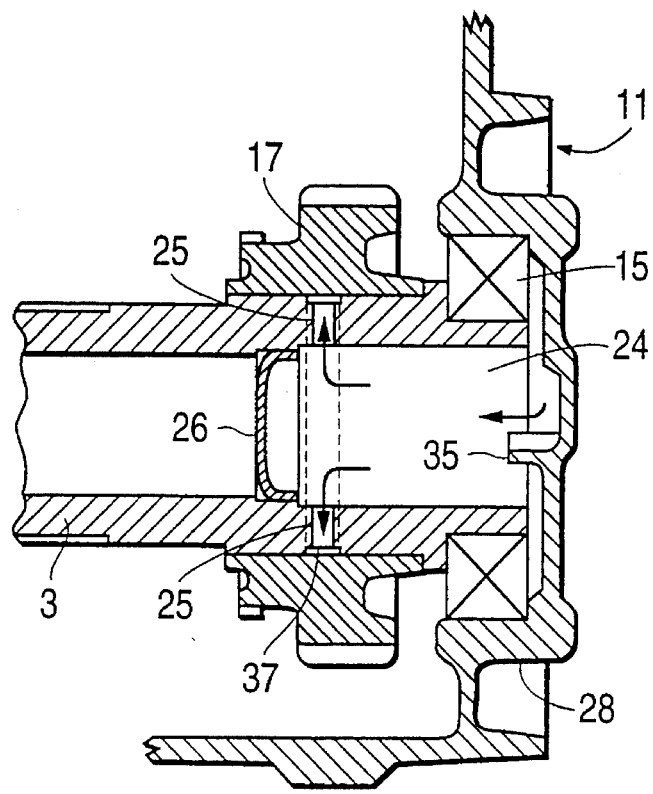
FIG. 2 is an enlarged cross-sectional view of a structure for introducing lubrication oil into a bore of a secondary shaft.
Figure 7:
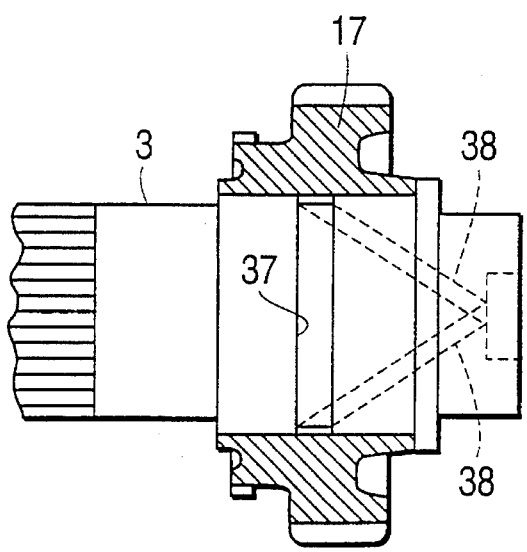
FIG. 7 is an enlarged cross-sectional view of a modified structure for introducing lubrication oil into a bore of a secondary shaft.

Referring to FIG. 2 showing a part of the power transfer apparatus around the secondary output shaft 3 in detail, the secondary output shaft 3, which is an open ended hollow shaft whose axial bore 24 functions as an oil passage, is formed with radially extending bores 25 at a position relatively close to the open end where the driven sprocket 17 is fitted. Immediately downstream from the radial bores 25 there is provided a plug cap 26 for blocking a lubrication oil flowing through the oil passage 24. The lubrication oil is introduced into these radial bores 25 through the oil passage 24. The secondary output shaft 3, which is hollow as was described previously, is formed with internal splines 3a in the interior wall at the rear portion for coupling a splined shaft 7a of the sliding yoke 7. The space between the plug cap 26 and the splined shaft 7a is filled with grease.

Figure 3:
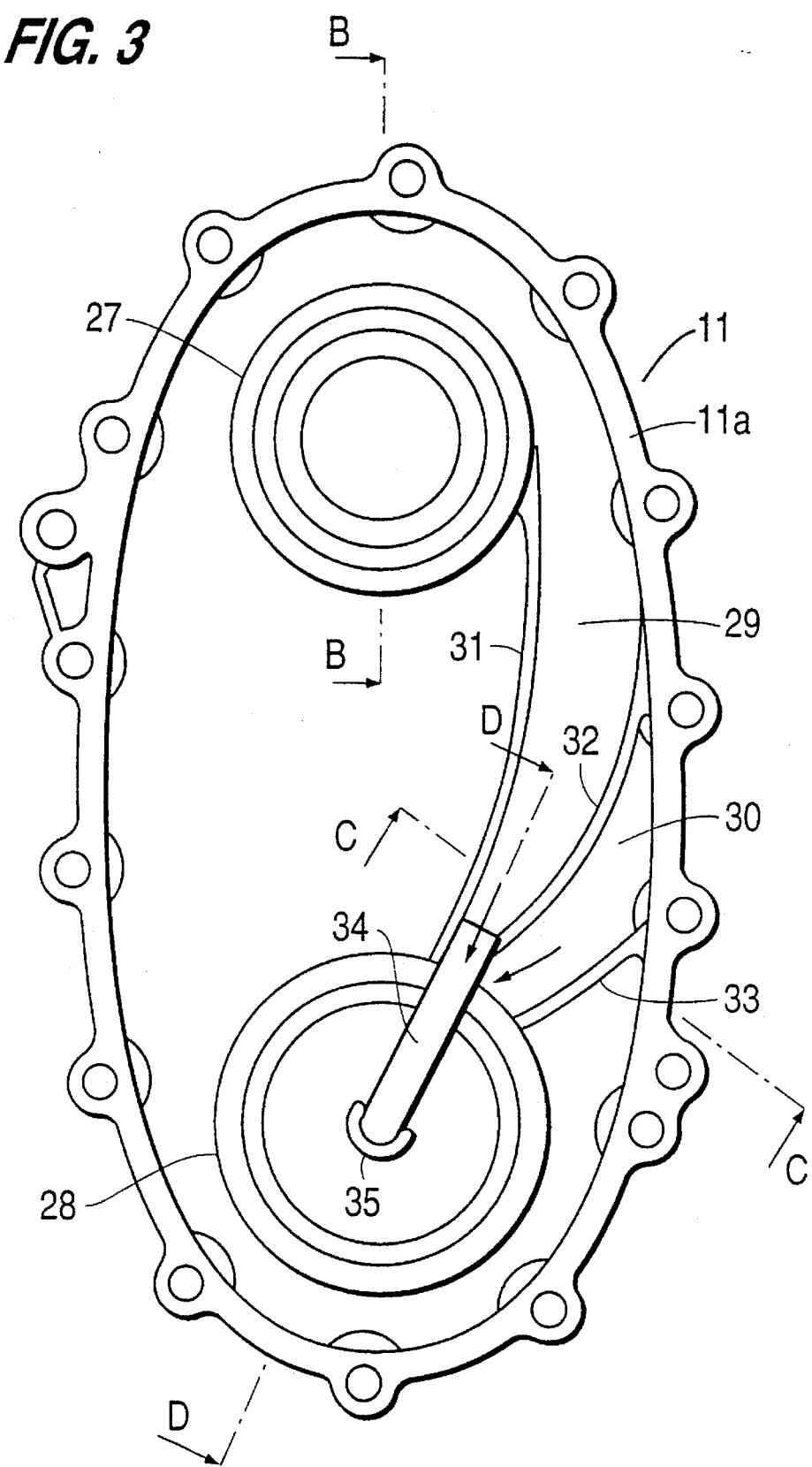
FIG. 3 is an enlarged front view of a rear casing cover with a lubrication means as viewed along line A—A of FIG. 1.
Figure 4:
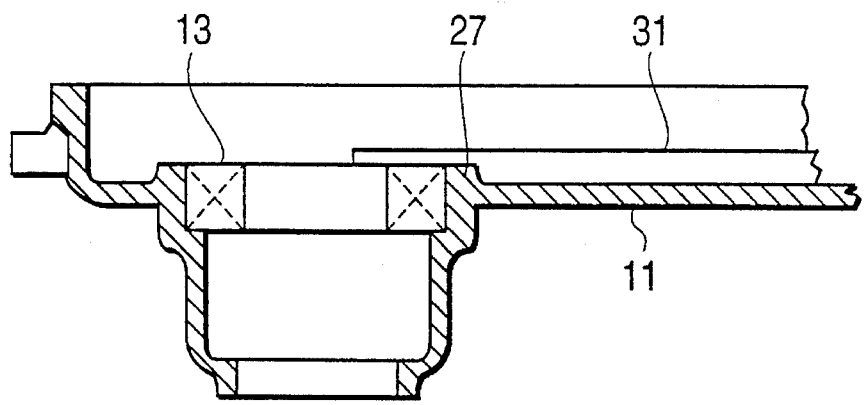
FIG. 4 is a sectional view taken along line B—B of FIG. 3.
Figure 5:
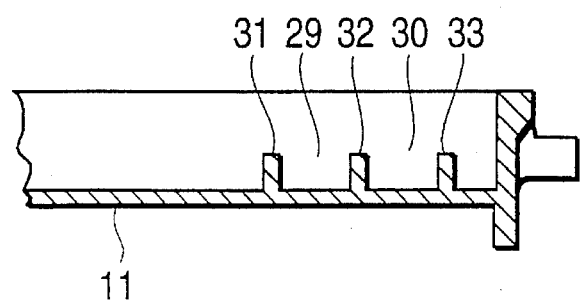
FIG. 5 is a sectional view taken along line C—C of FIG. 3.
Figure 6:
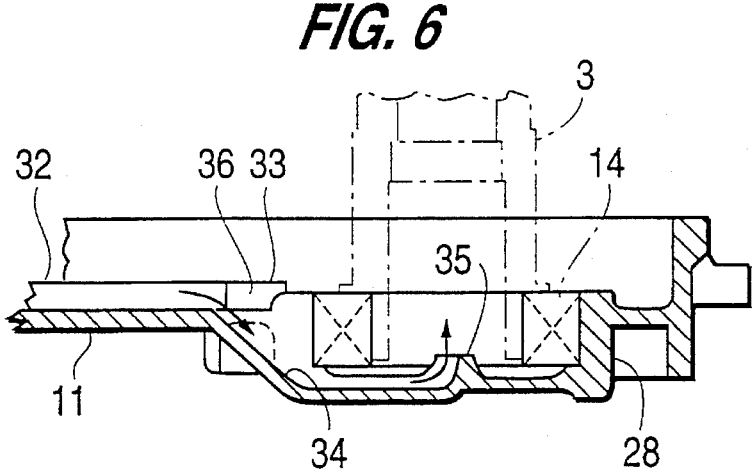
FIG. 6 is a sectional view taken along line D—D of FIG. 3.

Referring to FIGS. 3–6 showing the configuration of the rear casing cover 11 in detail, the rear casing cover 11 is integrally formed with upper and lower circular rims 27 and 28 extending in the interior of the transfer apparatus casing 5 for holding the thrust bearings 13 and 15, respectively. In the inside wall of the rear casing cover 11 there are formed first and second grooves 29 and 30, extending substantially vertically between these upper and lower rims 27 and 28 and transversely offset from a line connecting the centers of these upper and lower rims 27 and 28, for guiding and allowing the lubrication oil scooped up and splashed by the drive chain 18 to flow downward. In more detail, the first oil guide groove 29 is defined by and between a first rib 31 extending from one side of the upper rim 27 to the top of the lower rim 28 and a second rib 32 extending from the mid way of a peripheral rim 11a to the top of the lower rim 28. The second oil guide groove 30 is defined by and between the second rib 32 and a third rib 33 extending from the lower portion of the peripheral rim 11a to the upper side of the lower rim 28. These oil guide grooves 29 and 30 are located and curved alongside where the drive chain 18 runs downward so that they decrease their widths with downward progress. As shown in FIGS. 2 and 3, the first oil guide groove 29 communicates with a concave communication oil guide groove 34 extending to the center of the lower circular rim 28 where a semicircular oil receiver 35 (see FIG. 2) is provided so as to extend into the oil passage 24. The first and second oil guide grooves 29 and 30 (shown in FIGS. 3 and 5) are in communication with each other at their lower ends via a passage 36 (shown in FIG. 6) so as to introduce the lubrication oil flowing in the second oil guide groove 30 into the communication oil guide groove 34. By means of these first and second oil guide grooves 29 and 30, oil passage 24 and radial bores 25, a lubrication oil is compelled and delivered to the interface between the secondary output shaft 3 and the driven sprocket 17.

While the oil guide grooves 29 and 30 may be replaced with an oil pipe, nevertheless, various structural restraints must be imposed upon the structural simplicity of the transfer apparatus and relationships of structural elements within the transfer apparatus which are not always desirable.

With the power transfer apparatus thus structured, while the automotive vehicle runs, the transmission 2 provides driving force to the rear wheels through the rear propeller shaft 6a coupled to the primary output shaft 1. A part of the driving force is transmitted to the viscous coupling power transfer means 19 through the drive chain 18 engaging between the drive and driven sprockets 16 and 17. The power transfer means 19 transmits driving power, proportional or harmonious to a load on the front wheels, to the front wheels through the front propeller shaft 6b coupled to the secondary output shaft 3 via the sliding yoke 7. During this, the drive chain 18 is driven by the drive sprocket 16 and scoops up the lubrication oil in the transfer apparatus casing 5 and splashes it into the first and second oil guide grooves 29 and 30. The lubrication oil flows down to the semicircular oil receiver 35 and is fed into the oil passage 24. The lubrication oil is compelled to flow through the radial bores 25 under centrifugal force, so as to lubricate the interface between the secondary output shaft 3 and the driven sprocket 17.

In order to lubricate effectively the entire portion of the interface between the secondary output shaft 3 and the driven sprocket 17, it is desirable to form an outer circumferential groove 37 such that the radial bores 25 communicate with it. If the secondary output shaft 3 is not hollow, oil passages 38 or a spiral oil passage, slanting with respect to the center axis of rotation of the secondary output shaft 3 and extending from the shaft end, may be formed so as to communicate with an outer circumferential groove 37.

Figure 8:
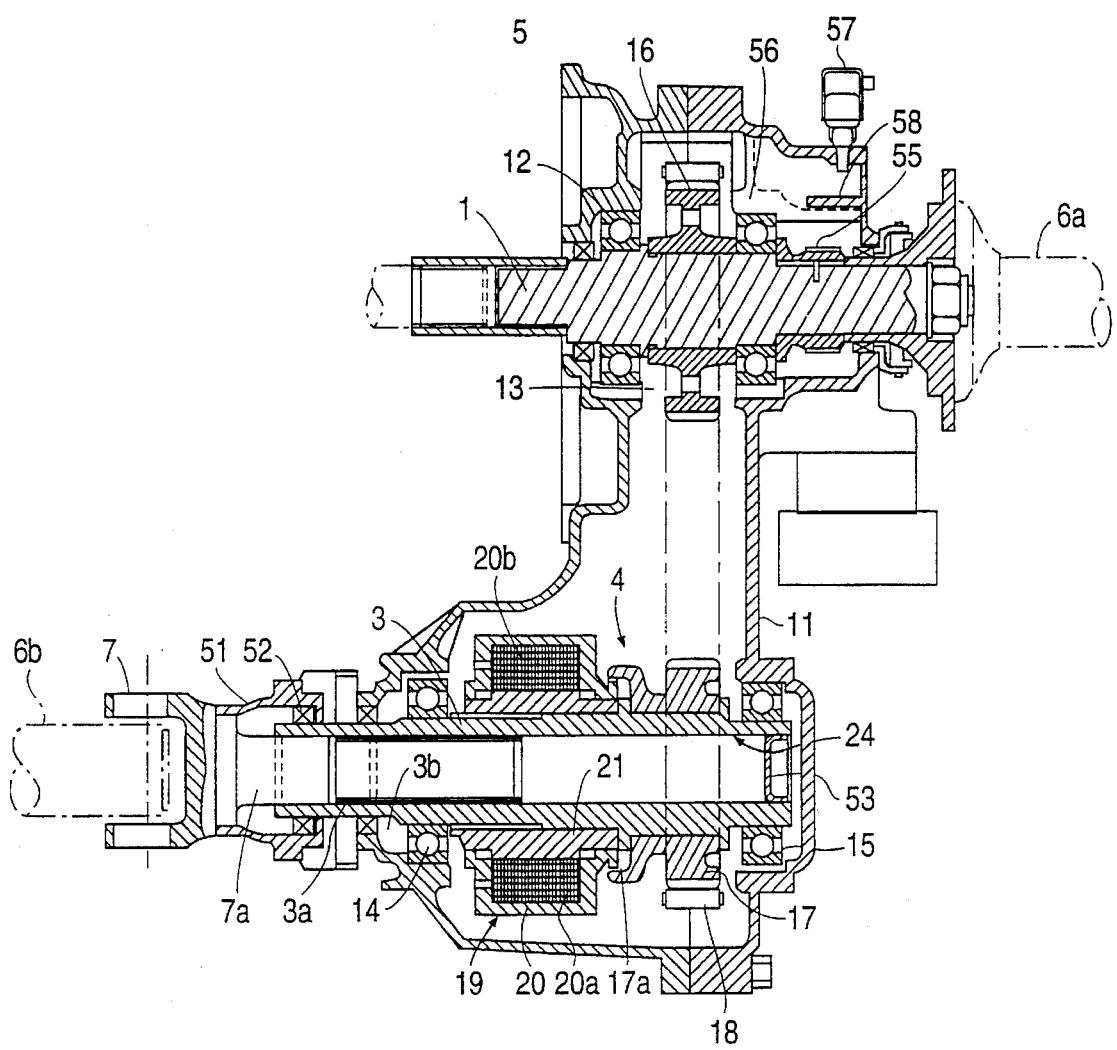
FIG. 8 is a cross-sectional view showing the essential parts of a power transfer apparatus for a four-wheel drive automotive vehicle in accordance with another preferred embodiment of the present invention.

Referring to FIG. 8 showing a power transfer apparatus in accordance with another preferred embodiment of the present invention, a primary input shaft 1 is provided with a gear 55, forming a part of a speed meter, secured thereon between a driven sprocket 16 and a rear propeller shaft 6a. Right above the speed meter gear 55 the rear casing cover 11 is formed with an oil guide opening 56 in the inner wall so as to enable lubrication oil scooped by a drive chain 18 to splash toward the speed meter gear 55 through the opening 56 and provided with a bleeder 57. Further, the rear casing cover 11 is integrally formed with a partition wall 58 between the gear 55 and the bleeder 57. A secondary output shaft 3 extends at one end in the close proximity of the rear casing cover 11 beyond a thrust bearing 15 and is provided with an end plug cap 53 fitted in an axial bore 24 at the extended end portion. On the other hand, the secondary output shaft 3 has a front shaft extension 3a extending out of the transfer housing 10. This front shaft extension 3a has internal splines 36 formed in the inner wall which cooperate with a splined shaft 7a of a sliding yoke 7 so as to provide a splined coupling between the secondary output shaft 3 and a front propeller shaft 6b. A front transfer housing cover 51 is attached to the transfer housing 10 through a sealing ring 52. In an axial bore 24 of the hollow output shaft 3 there is filled with grease between the end plug cap 53 and the splined shaft 7a of the sliding yoke 7.

In the above embodiments, it is feasible to couple the driven sprocket 17 directly to the inner barrel 21 of the power transfer means 19 in place of the outer drum 20. However, in this case, it is somewhat difficult to provide splined coupling between the outer drum 20 and the secondary output shaft 3.

In any of the above-described embodiments, the power transfer means 19 may be of a type well known to those in the art, such as fluid couplings, multi-discs clutches, hydraulic clutches, electromagnetic clutches and the like.

With the power transfer apparatus of the present invention, driving power is transmitted, on one hand directly, to the rear propeller shaft 6a and, on the other hand, to the front propeller shaft 6b through the drive chain 18 via the power transfer means 19, namely a viscous coupling. The front wheel driving line includes the sliding yoke 7 providing spline-coupling between the secondary output shaft 3 and the front propeller shaft 6b. Changes in distance between the transfer 4 and the front differential are canceled out by axial sliding movement of the sliding yoke 7 relative to the secondary output shaft 3, providing certain transmission of driving power to the front wheels in spite of up and down motion of the front suspensions. In this instance, whereas, since, as was previously described, the sliding yoke 7 is interconnected to the front propeller shaft 6b at an angle so as to support the weight of the front propeller shaft 6b, the secondary output shaft 3 suffers a rotational moment and experiences swaying engagement relative to the front propeller shaft 6b at the splined joint, causing vibrations and noise, nevertheless, the power transfer means 19, mounted on the secondary hollow output shaft 3, functions as antivibration mass relative to the secondary output shaft 3, providing a reduction in the natural frequency of the secondary hollow output shaft 3 and consequently, reducing the resonance frequency of the secondary output shaft 3 less than those responsive to normal rotational speeds of engines. As a result, the power transfer apparatus reduces noise remarkably. In other words, the power transfer apparatus operates quietly without any provision of special antivibration devices.

Further, because of the use of a hollow shaft, the secondary output shaft 3 has an greater area of heat radiating surface which is larger than those of secondary output shafts having rigid portions. Consequently, heat generated between the power transfer means 19 and the secondary output shaft 3 is quickly radiated, preventing overheating of the power transfer means 19 so as to assure reliable operation of the power transfer means 19. Furthermore, the side-by-side arrangement of the power transfer means 19 and the driven sprocket 17 enables to provide long splines 3b formed in the inner wall of the secondary output shaft 3. The provision of long splines 3b ensures the sliding yoke 7 to follow even large vertical motion of the suspensions, ensuring the transmission of driving power to the rear wheel drive line.

In the transfer apparatus in accordance the first preferred embodiment of the present invention, the first and second oil guide grooves 29 and 30, simply formed integrally with the rear casing cover 11, introduce lubrication oil in the transfer apparatus casing 5 scooped up by the drive chain 18 into the axial bore 24, as an oil passage, of the secondary output shaft 3. These oil guide grooves 29 and 30 are configured such that they decrease their widths with downward progress, so that the lubrication oil speeds up as flowing downward, thereby assuring lubrication of the driven sprocket 17. The provision of the second oil guide groove 30 in communication with the first oil guide groove 29 at the downstream end collects lubrication oil splashed from the drive chain 18 and introduces it into the communication oil guide groove 34, providing for the interface between the driven sprocket 17 and the secondary output shaft 3 a sufficient amount of lubrication oil.

With the transfer apparatus in accordance the second preferred embodiment of the present invention, the oil guide opening 56 is formed so as to enable lubrication oil scooped by the drive chain 18 to splash therethrough toward the speed meter gear 55, assuring lubrication of the speed gear meter 55. While the speed meter gear 55 splashes the lubrication oil, splashes of the lubrication oil are prevented by the partition wall 58 from leaping directly to the bleeder 57 and leaking out of the transfer apparatus casing 5, keeping the exterior of the transfer apparatus casing 5 clean.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A driving power transfer apparatus, having a primary output shaft for providing driving power for a rear propeller shaft and a secondary hollow output shaft arranged in parallel with the primary output shaft for providing driving power for a front propeller shaft, for four-wheel drive automotive vehicles, said driving power transfer apparatus comprising:

power transmission means operationally coupled to the primary output shaft for putting out driving power from the primary output shaft;

a sliding yoke providing splined joint between the secondary output shaft and the front propeller shaft; and power transfer means, supported on the secondary output shaft, for variably transmitting said driving power to the secondary output shaft from said power transmitting means.

2. A power transfer apparatus as defined in claim 1, wherein said power transmission means comprises a drive sprocket fixedly mounted on the primary output shaft and a driven sprocket mounted for rotation on the secondary output shaft, said drive sprocket and said driven sprocket being engaged by a drive chain.

3. A power transfer apparatus as defined in claim 2, wherein said driven sprocket is arranged adjacently to said variable power transmission means.

4. A power transfer apparatus as defined in claim 2, wherein said power transfer means comprises a fluid coupling having an inner drum fixedly mounted on the secondary output shaft and an outer drum spline-coupled to said driven sprocket and fitted onto said inner drum so as to rotate relative to said inner drum.

5. A power transfer apparatus as defined in claim 2, wherein said power transfer means comprises an electromagnetic coupling having an inner drum fixedly mounted on the secondary output shaft and an outer drum spline-coupled to said driven sprocket and fitted onto said inner drum so as to rotate relative to said inner drum.

6. A power transfer apparatus as defined in claim 2, and further comprising lubrication means for lubricating an interface between said driven sprocket and the secondary output shaft.

7. A power transfer apparatus as defined in claim 6, wherein said lubrication means comprises an oil guide groove formed integrally with a casing of the power transfer apparatus for collecting lubrication oil scooped and splashed by said drive chain and introducing said lubrication oil inside the secondary output shaft and a radial bore formed in the secondary output shaft for enabling said lubrication oil to be impelled to said interface.

8. A power transfer apparatus as defined in claim 7, wherein said oil guide groove is formed substantially vertically and decreases in width downwardly along said groove.

9. A power transfer apparatus as defined in claim 2, and further comprising a gear fixedly mounted on the primary output shaft forming a part of a speed meter and oil guide means for allowing lubrication oil scooped and splashed by said drive chain to splash over said gear.

10. A power transfer apparatus as defined in claim 9, wherein said oil guide means comprises an opening formed in a partition wall between said drive sprocket and said gear.

11. A power transfer apparatus as defined in claim 10, and further comprising a bleeder provided on a casing of the power transfer apparatus and a partition wall formed integrally with said casing right above said gear.

12. A power transfer apparatus as defined in claim 1, wherein said secondary output shaft is tightly closed at opposite ends and filled with grease.

13. A power transfer apparatus as defined in claim 1, wherein said primary output shaft comprises an output shaft of a transmission.

14. A driving power transfer apparatus, having a primary output shaft for providing driving power for a rear propeller shaft and a secondary hollow output shaft arranged in parallel with the primary output shaft for providing driving power for a front propeller shaft, for four-wheel drive automotive vehicles, said driving power transfer apparatus comprising:

power transmission means, including at least a rotary member mounted for rotation on the secondary output shaft, for putting out driving power from the primary output shaft;

power transfer means, mounted on the secondary output shaft, for variably transmitting said driving power to the secondary output shaft from said power transmitting means; and lubrication means for lubricating an interface between said rotary member and the secondary output shaft.

15. A power transfer apparatus as defined in claim 14, wherein said power transmission means comprises a drive sprocket fixedly mounted on the primary output shaft and a driven sprocket as said rotary member, said drive sprocket and said driven sprocket being engaged by a drive chain.

16. A power transfer apparatus as defined in claim 15, wherein said lubrication means comprises an oil guide groove formed integrally with a casing of the power transfer apparatus for collecting lubrication oil scooped and splashed by said drive chain and introducing said lubrication oil inside the secondary output shaft and a radial bore formed in the secondary output shaft for enabling said lubrication oil to be impelled to said interface.

17. A power transfer apparatus as defined in claim 16, wherein said oil guide groove is formed substantially vertically and decreases a widths with downward progress.

* * * * *